United States Patent
Mu

(10) Patent No.: US 12,471,105 B2
(45) Date of Patent: Nov. 11, 2025

(54) METHODS AND APPARATUS FOR SENDING AND RECEIVING PHYSICAL DOWNLINK CONTROL CHANNEL, AND ELECTRONIC DEVICE

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 415 days.

(21) Appl. No.: 17/927,512

(22) PCT Filed: May 25, 2020

(86) PCT No.: PCT/CN2020/092183
§ 371 (c)(1),
(2) Date: Nov. 23, 2022

(87) PCT Pub. No.: WO2021/237427
PCT Pub. Date: Dec. 2, 2021

(65) Prior Publication Data
US 2023/0247640 A1     Aug. 3, 2023

(51) Int. Cl.
*H04W 72/23*     (2023.01)
*H04L 1/08*     (2006.01)

(52) U.S. Cl.
CPC .............. *H04W 72/23* (2023.01); *H04L 1/08* (2013.01)

(58) Field of Classification Search
CPC ......... H04W 72/23; H04L 1/08; H04L 5/0053
See application file for complete search history.

(56) References Cited

U.S. PATENT DOCUMENTS

| | | |
|---|---|---|
| 2011/0105162 A1 | 5/2011 | Kim et al. |
| 2014/0177582 A1 | 6/2014 | Wu et al. |
| 2016/0249331 A1* | 8/2016 | Park ............... H04L 5/0053 |
| 2018/0376498 A1* | 12/2018 | Bhattad ............... H04L 1/08 |
| 2019/0037540 A1 | 1/2019 | Seo et al. |
| 2019/0182807 A1 | 6/2019 | Panteleev et al. |
| 2019/0297607 A1* | 9/2019 | Kim ............... H04W 72/23 |

(Continued)

FOREIGN PATENT DOCUMENTS

| | | |
|---|---|---|
| CN | 102255688 A | 11/2011 |
| CN | 104285490 A | 1/2015 |

(Continued)

OTHER PUBLICATIONS

Interdigital: "NB-PDCCH for NB-IoT", 3GPP TSG RAN WG1 NB-IoT Ad-Hoc Meeting, RI-161915, Mar. 16, 2016 (Mar. 16, 2016).

(Continued)

*Primary Examiner* — Sujoy K Kundu
*Assistant Examiner* — Vladislav Y Agureyev
(74) *Attorney, Agent, or Firm* — Volpe Koenig

(57) ABSTRACT

A method for sending and receiving a physical downlink control channel (PDCCH). The method for sending a PDCCH includes: determining, from a candidate search space set for the physical downlink control channel (PDCCH) multiple repetition transmissions, a search space for sending a PDCCH, the candidate search space set for the PDCCH multiple repetition transmissions includes all search spaces or at least one search space in a time unit; and sending the PDCCH based on the determined search space.

20 Claims, 7 Drawing Sheets

(56) References Cited

U.S. PATENT DOCUMENTS

| | | | |
|---|---|---|---|
| 2020/0022144 A1* | 1/2020 | Papasakellariou | H04L 5/0053 |
| 2020/0204294 A1* | 6/2020 | Ma | H04W 72/0446 |
| 2020/0351129 A1* | 11/2020 | Kwak | H04W 72/53 |
| 2020/0404635 A1* | 12/2020 | Bendlin | H04L 5/0053 |
| 2020/0412515 A1* | 12/2020 | Xu | H04W 4/70 |
| 2021/0136689 A1* | 5/2021 | Kim | H04W 24/08 |
| 2021/0160827 A1* | 5/2021 | Kim | H04L 5/0094 |
| 2021/0195600 A1* | 6/2021 | Khoshnevisan | H04W 72/53 |
| 2021/0282123 A1* | 9/2021 | Wong | H04L 1/08 |
| 2021/0314866 A1* | 10/2021 | Lee | H04W 52/0229 |
| 2021/0321446 A1* | 10/2021 | Lee | H04L 5/005 |
| 2021/0329647 A1* | 10/2021 | Park | H04W 56/001 |
| 2022/0053468 A1* | 2/2022 | Chen | H04L 5/0035 |
| 2022/0240111 A1* | 7/2022 | Jang | H04W 72/23 |
| 2023/0362892 A1* | 11/2023 | Khoshnevisan | H04W 48/12 |

FOREIGN PATENT DOCUMENTS

| | | | | |
|---|---|---|---|---|
| CN | 104811409 A | | 7/2015 | |
| CN | 105871527 A | | 8/2016 | |
| CN | 107690762 A | | 2/2018 | |
| CN | 109041243 A | | 12/2018 | |
| CN | 109286983 A | | 1/2019 | |
| CN | 109391361 A | | 2/2019 | |
| CN | 110166197 A | | 8/2019 | |
| CN | 113169841 A | * | 7/2021 | H04L 1/0072 |
| CN | 115280870 A | * | 11/2022 | H04L 1/08 |
| CN | 113676301 B | * | 4/2023 | H04W 72/23 |
| EP | 3681089 A1 | * | 7/2020 | H04L 5/00 |
| EP | 3420661 B1 | * | 12/2021 | H04L 1/0046 |
| EP | 3735752 B1 | * | 1/2023 | H04J 11/0086 |
| KR | 20210059700 A | * | 5/2021 | H04W 52/0235 |
| WO | 2013099268 A1 | | 7/2013 | |
| WO | WO-2020098685 A1 | * | 5/2020 | H04L 1/1812 |
| WO | WO-2020166045 A1 | * | 8/2020 | H04L 27/2602 |
| WO | WO-2020211096 A1 | * | 10/2020 | H04W 72/23 |
| WO | WO-2021081949 A1 | * | 5/2021 | H04L 5/0053 |
| WO | WO-2021159451 A1 | * | 8/2021 | |

OTHER PUBLICATIONS

Intel Corporation, "NR PDCCH: Search Spaces and monitoring behavior",3GPP TSG RAN WG1 NR Adhoc #2,R1-1710544,Qingdao, P.R. China, Jun. 20-23, 2017.
Analysis of NB IoT Channel NB-PDCCH and Resource Scheduling Principles.

* cited by examiner

| Pattern 1 | |
|---|---|
| AL | Number of PDCCH location |
| 4 | 2 |
| 8 | 1 |
| 16 | 1 |

FIG. 4a

| Pattern 2 | |
|---|---|
| AL | Number of PDCCH location |
| 4 | 0 |
| 8 | 0 |
| 16 | 1 |

FIG. 4b

METHODS AND APPARATUS FOR SENDING AND RECEIVING PHYSICAL DOWNLINK CONTROL CHANNEL, AND ELECTRONIC DEVICE

CROSS REFERENCE TO RELATED APPLICATION

The present application is a U.S. National Stage of International Application No. PCT/CN2020/092183, filed on May 25, 2020, the contents of all of which are incorporated herein by reference in their entireties for all purposes.

BACKGROUND

In LTE 4G system, two technologies, machine type communication (MTC) and narrow band Internet of thing (NB-IoT) are provided in order to support Internet of Things service. The two technologies are mainly aimed at low-rate, high-latency and other scenarios. For example, meter reading, environmental monitoring and other scenarios. At present, NB-IoT can only support a maximum rate of several hundred kilobytes (k), and MTC can only support a maximum rate of several megabytes (M). However, in another aspect, with the continuous development of Internet of Things services, services such as video surveillance, smart home, wearable devices, and industrial sensor monitoring are popularized. These services generally require a rate of several tens megabytes to 100 megabytes, and also have a relatively high requirement on latency at the same time, and thus, the technologies of MTC and NB-IoT in the LTE are difficult to meet the requirement.

SUMMARY

In one aspect, the present disclosure provides a method for sending a physical downlink control channel, the method including:
  determining, from a candidate search space set for the PDCCH multiple repetition transmissions, a search space for sending the PDCCH, where the candidate search space set for the PDCCH multiple repetition transmissions includes all search spaces or at least one search space in one time unit; and
  sending the PDCCH based on the determined search space.

In another aspect, the present disclosure provides a method for receiving a physical downlink control channel, the method including:
  determining a candidate search space set for the PDCCH multiple repetition transmissions; and
  blind decoding the PDCCH based on a determined candidate search space set for the PDCCH multiple repetition transmissions, where the candidate search space set for the PDCCH multiple repetition transmissions includes all search spaces or at least one search space in one time unit.

The present disclosure further provides an electronic device, and the electronic device includes a memory and a processor;
  a memory, on which a computer program is stored; and
  the processor is used to execute a sending method or a receiving method of a physical downlink control channel provided in the present disclosure when the computer is executing computer program.

The present disclosure is further provide a non-transitory computer-readable storage medium on which a computer program is stored, and the computer program is used to implement the sending method or the receiving method of a physical downlink control channel provided in the present disclosure when the computer program is run by the processor.

The beneficial effects brought by the technical solutions provided in the embodiments of the present disclosure is described below in conjunction with specific optional embodiments, and no further description will be given here.

BRIEF DESCRIPTION OF THE DRAWINGS

In order to more clearly explain the technical solutions in the embodiments of the present disclosure, the following will briefly introduce the attached drawings that need to be used in the description of the embodiments.

FIGS. 4a and 4b are schematic diagrams of two correspondence relationships between the repetition number and a search space configuration parameter according to an example of the present disclosure;

DETAILED DESCRIPTION

Figure 1A:
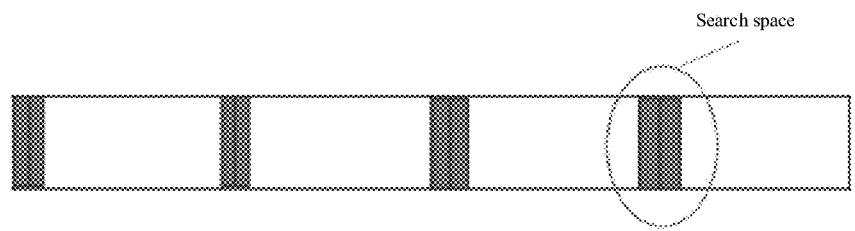
FIG. 1a is a schematic diagram of a search space with a distributed configuration.

The embodiments of the present disclosure are described in detail below. Examples of the embodiments are shown in the accompanying drawings, in which the same or similar reference numerals represent the same or similar elements with the same or similar functions. The embodiments described below with reference to the accompanying drawings are exemplary, and are merely used to explain the present disclosure and cannot be interpreted as a limitation on the present disclosure.

Those skilled in the art may understand that the singular forms "one", "one piece", "said", and "the" used here may also include the plural forms, unless specifically stated. It should be further understood that the terms "comprise/include" used in the specification of the present disclosure refers to the presence of the stated features, integers, steps, operations, units, and/or components, but do not exclude the presence or addition of one or more other features, integers, steps, operations, units and/or components, and/or combinations thereof. It should be understood that when it is said that an element is "connected" or "coupled" to another element, the element may be directly connected or coupled to other elements, or there may be intermediate elements. In addition, the "connected" or "coupled" used in the specification may include wireless connection or wireless coupling. The words "and/or" used in the specification include all or any unit and all combinations of one or more of the associated listed items.

Unless otherwise defined, all terms (including technical terms and scientific terms) used here have the same meaning as the general understanding of those of ordinary skill in the art to which the present disclosure belongs. The "user equipment", "terminal", and "terminal equipment" used here include equipment provided with wireless signal receivers, which is equipment only provided with wireless signal receivers without transmission capability, and also include equipment provided with receiving and transmitting hardware, which is equipment provided with receiving and transmitting hardware capable of carrying out two-way communication in a two-way communication link. Such device may include: a cellular or other communication device having a single-line display or a multi-line display or a cellular or other communication device without a multi-line display; personal communications service (PSC), which may be combined with voice, data processing, facsimile and/or data communication capabilities; personal digital assistant (PDA), which may include a radio frequency receiver, a pager, Internet/Intranet access, a web browser, a notepad, a calendar and/or a global positioning system (GPS) receiver; and a conventional laptop and/or palmtop computer or other device having and/or including a radio frequency receiver. The "terminal", "terminal equipment", and "user equipment" used here may be portable, transportable, installed in (aerial, marine and/or land) transportation means, or may be suitable for running locally and/or be configured to run locally, and/or run at any other position in the earth and/or a space in a distributed form. The "terminal", "terminal equipment" and "user equipment" used here may also be communication terminals, Internet terminals, and music/video playing terminals, such as PDAs, mobile Internet devices (MIDs) and/or mobile phones with music/video playing functions, or may be smart TVs, set-top boxes and other equipment.

In order to better understand and describe various optional implementations provided by the present disclosure, the following first briefly introduces the technology related to the present disclosure.

The present disclosure relates to the technical field of communications, and in particular to, a method and an apparatus for sending and receiving a physical downlink control channel (PDCCH), and an electronic device.

In LTE 4G system, two technologies, machine type communication (MTC) and narrow band Internet of thing (NB-IoT) are provided in order to support Internet of Things service. The two technologies are mainly aimed at low-rate, high-latency and other scenarios. For example, meter reading, environmental monitoring and other scenarios. At present, NB-IoT can only support a maximum rate of several hundred kilobytes (k), and MTC can only support a maximum rate of several megabytes (M). However, in another aspect, with the continuous development of Internet of Things services, services such as video surveillance, smart home, wearable devices, and industrial sensor monitoring are popularized. These services generally require a rate of several tens megabytes to 100 megabytes, and also have a relatively high requirement on latency at the same time, and thus, the technologies of MTC and NB-IoT in the LTE are difficult to meet the requirement. Based on this situation, the requirement of designing a kind of new user equipment in 5G new radio (NR) to cover such a middle-end Internet of Things device is provided. In the current 3GPP standardization, the new terminal type is called Reduced capability UE or NR-lite for short.

5G NR-lite generally needs to meet requirements such as low cost, low complexity, coverage enhancement to a certain extent, and power saving. However, the current NR system is designed for high-end terminals such as high-rate and low-latency, and cannot be applied well or meet the requirements of the NR-lite. In view of this situation, the current NR system needs to be modified to meet the requirements of the NR-lite. For example, in order to meet the requirements of low cost and low complexity, the radio frequency (RF) bandwidth of the NR-IoT may be limited, e.g. to 5 MHz or 10 MHz, or the buffer size of the NR-lite may be limited, such that the size of each received transport block is limited, and the like. For power saving, the possible optimization direction is to simplify the communication process and reduce the number of times that an NR-lite user detects a downlink control channel, etc.

The basic component unit of the PDCCH in the NR system is a resource element group (REG), one REG corresponds to the size (12 resource elements (REs)) of one physical resource block (PRB) in a frequency domain, and corresponds to the size of one orthogonal frequency division multiplexing (OFDM) symbol in a time domain. Six REGs form a control channel element (CCE). In the current NR system, one PDCCH may be formed by 1, 2, 4, 8, and 16 CCEs, and the number of CCEs included in one PDCCH may be referred to as an aggregation level (AL). In the case that information bits of a PDCCH are fixed, the AL of the PDCCH is mainly determined by channel conditions. In the case that the channel conditions of the user are relatively good, a smaller AL may be used; and in the case that the channel conditions of the user are relatively poor, a greater AL may be selected. In addition, for different aggregation levels of PDCCH, a protocol supports a plurality of candidate transmission locations. For example, for a PDCCH with CCE=4, there may be two candidate transmission locations, and a base station and a user equipment may calculate a CCE number of the two candidate locations in the configured control resource set based on a preset rule, such as CCE #0~CCE #3, and CCE #4~CCE #7.

In the NR system, the protocol specifies the maximum number of blind decoding (BD) of the user (namely, user equipment) in one slot under different subcarrier interval parameters (corresponding to u in the following table), as shown in the following Table 1.

TABLE 1

| $\mu$ | Maximum number of monitored PDCCH candidates per slot and per serving cell $M_{PDCCH}^{max,slot\ \mu}$ |
|---|---|
| 0 | 44 |
| 1 | 36 |
| 2 | 22 |
| 3 | 20 |

At the same time, in one slot, the total number of non-overlapping CCEs monitored by the user cannot exceed the number shown in the following Table 2;

TABLE 2

| μ | Maximum number of non-overlapped CCEs per slot and per serving cell $C_{PDCCH}^{max,slot\ \mu}$ |
| --- | --- |
| 0 | 56 |
| 1 | 56 |
| 2 | 48 |
| 3 | 32 |

Figure 1B:
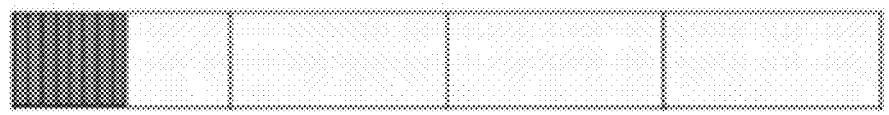
FIG. 1b is a schematic diagram of a search space with a centralized configuration.

In the NR-lite, because the capability of the user equipment is weakened, the coverage capability of the user equipment in the NR-lite is worse than that of a normal NR user equipment, and the PDCCH needs to be repeatedly transmitted. At the same time, for power saving, it is better to use a centralized transmission rather than a distributed transmission for repeated (namely, possibly requiring repeated transmissions) PDCCH transmissions. FIG. 1a and FIG. 1b respectively show a schematic diagram of a search space with a distributed configuration and a search space with a centralized configuration. The figure shows four slots, the search space shown in FIG. 1a may be understood as a search space corresponding to a searchSpaceId (namely, an ID of a search space set), and one searchSpaceId may be configured with one or more search spaces. As shown in FIG. 1a, one slot is configured with one search space corresponding to one searchSpaceId, one searchSpaceId is configured with two search spaces (parts with padding in the figure), while in the centralized distribution shown in FIG. 1b, one slot may be configured with a plurality of search spaces corresponding to the searchSpaceId. If the centralized transmission is considered, although power may be saved, limits on the number of blind decoding and on the non-overlapping CCEs may be exceeded in one slot.

In order to better meet communication requirements, a method for reducing the number of blind decoding of the user equipment or the non-overlapping CCE enables more PDCCH repetition transmission that can be supported in one slot. The present disclosure provides a method and an apparatus for sending and receiving a physical downlink control channel, and an electronic device.

The technical solutions of the present disclosure and how the technical solutions of the present disclosure solve the above technical problems will be described in detail below with specific embodiments. The following specific embodiments may be combined with each other, and the same or similar concepts or processes may not be described in detail in some embodiments. The embodiments of the present disclosure will be described below with reference to the accompanying drawings.

In order to make the purposes, technical solutions, and advantages of the present disclosure clearer, the principles on which each optional implementation provided in the present disclosure are based will be first described below. It should be noted that each optional implementation of the present disclosure may be implemented based on part or all of the principles described below, and different optional implementations may also be combined with each other on the premise that no conflict exists. Based on the technical principles described below in the present disclosure, those skilled in the art may make adjustments, modifications, improvements, or combinations for each optional implementation, and all of these shall fall within the scope of the disclosure.

Principle One:

In some examples, a search space that may be used for the PDCCH multiple repetition transmissions may be configured in one slot, in other words, a dedicated candidate search space that may be used for the PDCCH multiple repetition transmissions may be configured in one slot, and the dedicated candidate search space may also be referred to as a designated search space or a specific search space, and a base station may send the PDCCH one or more times in these search spaces.

In some examples, for a candidate search space in one slot (which may be any search space in the slot, or may be the dedicated search space configured to repeatedly transmit the PDCCH), different aggregation levels of CCEs and/or different candidate transmission locations of the PDCCH (Number of PDCCH candidates, which may also be referred to as Number of PDCCH locations) supported within each search space may be agreed or configured. In other words, for the PDCCH that may be retransmitted, the CCE aggregation level and/or the candidate transmission locations of the PDCCH corresponding to the search space for transmitting the PDCCH may be different from the existing ones, and the CCE aggregation level of the search space and/or the candidate transmission locations of the PDCCH are limited to avoid or reduce the problem that the limitation on the number of blind decoding and on the non-overlapping CCEs may be exceeded in one slot.

Figure 2:
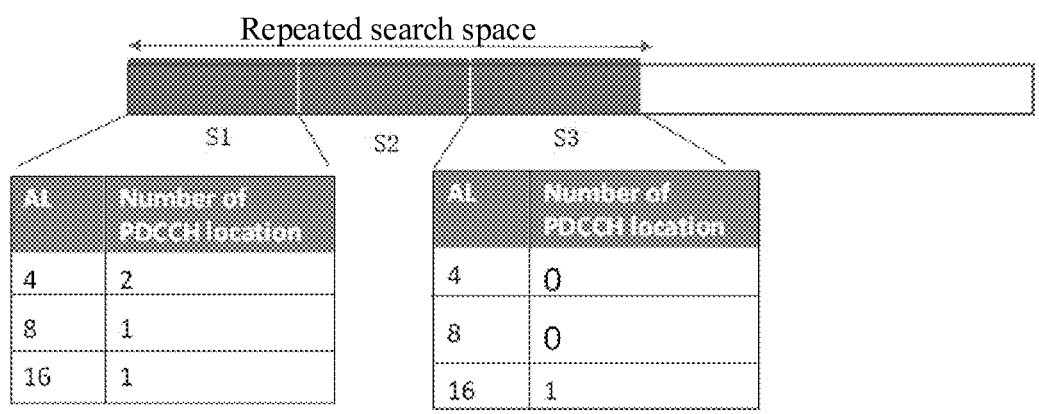
FIG. 2 is a schematic diagram of a configuration manner of a search space according to an example of the present disclosure.

As an example, FIG. 2 shows a schematic diagram of the configuration of the candidate search space in one slot based on the above principle. In this example, three candidate search spaces (the repeated search space shown in the figure, i.e., Repeated SS) used for the PDCCH multiple repetition transmissions are configured in one slot, that is, the candidate search spaces S1, S2, and S3 shown in the figure. As shown in FIG. 2, CCE AL 4, 8, and 16 are supported in the first candidate search space S1, only CCE AL 16 is supported in the second and third candidate search spaces. In addition, the candidate transmission locations of the PDCCH (that is, the Number of the PDCCH location shown in the figure) corresponding to each aggregation level may also be configured. As shown in FIG. 2, in this example, for three search spaces that may be used for the PDCCH multiple repetition transmissions, the space S1 corresponds to a mapping relationship between each aggregation level and candidate transmission locations of the PDCCH in an AL set, and the space S2 and the space S3 correspond to another mapping relationship between each aggregation level and candidate transmission locations of the PDCCH in the AL set. For example, there are two candidate transmission locations of the PDCCH corresponding to aggregation level 4 supported by space S1, and one candidate transmission location of the PDCCH corresponding to aggregation level 8, while the space S2 and space S3 only support aggregation level 16, and there is one candidate transmission location of the PDCCH corresponding to the level 16.

Based on the solution in FIG. 2, when the base station sends the PDCCH to a user equipment of NR-lite type, if the PDCCH is sent only once, one of the above three search spaces may be selected, and if the PDCCH is sent twice, two of the above three search spaces may be selected. However, when the PDCCH is sent twice, since the aggregation levels supported by the space S1 include 4, 8, and 16, and the space S2 and S3 only support the aggregation level 16, when the base station sends the PDCCH, the aggregation level corresponding to the selected search space can only be 16. When receiving the PDCCH sent by the base station, that is, when performing PDCCH blind decoding, the UE may perform corresponding blind decoding based on the above configuration in the above three search spaces, and optionally, the above configuration information may be indicated to the user equipment by the base station, or may be agreed by a protocol.

In some examples, in the above optional solution, candidate search spaces with different configurations that may be used for repeatedly transmitting the same PDCCH may be the same search space (namely, the searchSpaceIds are the same, which may be understood as belonging to the same search space set), or may be the different search spaces (the searchSpaceIds are different). In some examples, for the case of using the same search space, when the search space is configured, patterns of two or more AL and the candidate transmission locations of the PDCCH may be configured, that is, the described mapping relationship. For example, in the above example shown in FIG. 2, two different patterns are configured, and for which pattern needs to be used in a certain PDCCH repeated transmission in the search space, the base station may be configured or may be set based on a preset rule, that is, the base station may issue indication information of which pattern is adopted to the UE, or the base station and UE may determine which pattern is adopted based on a pre-agreed rule, for example, a pattern 1 is used in the first search space in one slot, and a pattern 2 is used in the remaining search spaces.

In some examples, for the case of using different search spaces, the base station may be configured, or the base station and the UE may pre-agree which search space(s) may be used for multiple repeatedly transmitting the same PDCCH, or default that all configured candidate search spaces in the slot may be used for transmission. For example, for one UE, the UE may correspond to search spaces under a plurality of searchSpaceIds. During PDCCH transmission, the base station may send the indication information to the UE to indicate which searchSpaceId(s) corresponding to the UE may be used for multiple repeatedly transmitting the same PDCCH. For example, if the searchSpaceId indicated by the base station is ID1, the UE may perform PDCCH blind decoding in the candidate search space corresponding to the ID1 that may be used for multiple repeatedly transmitting the same PDCCH, and for example, based on the configuration shown in FIG. 2, the UE may perform PDCCH blind decoding in three candidate search spaces corresponding to ID1.

Principle Two:

In some examples, use objects of the candidate search space in one slot may be limited, that is, a certain candidate search space can only be used for a PDCCH with a specific repeated transmission times (namely, a repetition number). In other words, for the same PDCCH, the search space used for transmitting the PDCCH may be determined based on the number of times that the PDCCH needs to be transmitted.

Figure 3:
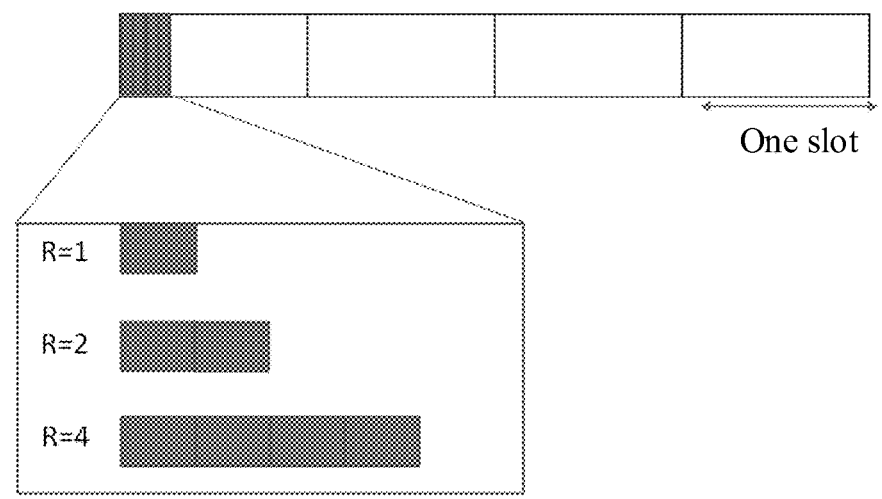
FIG. 3 is a schematic diagram of a correspondence relationship between repetition number and a search space according to an example of the present disclosure.

As an example, FIG. 3 shows a schematic diagram of a configuration of a search space based on the principle. As shown in the figure, four candidate search spaces (that is, a search space that may be used for the PDCCH multiple repetition transmissions) for repetition transmission are configured in one slot. R in the figure represents the repetition transmissions of the PDCCH, that is, the number of sending. In this example, if the repetition transmissions of the PDCCH is 1 (R=1, i.e. the PDCCH is sent only once), then the PDCCH may be limited to be transmitted only in the first candidate search space shown in the figure, and if the repetition transmissions of the PDCCH is 2, the PDCCH may be limited to be transmitted repeatedly in the first candidate search space and the second candidate search space shown in the figure. The PDCCH may also be limited to being transmitted repeatedly in the first candidate search space and the third candidate search space. If the repetition transmissions is 4, then the PDCCH is repeatedly sending in four candidate search spaces.

It should be noted that, in each example of the present disclosure, the first, second and other description manners are only for the convenience of description, and are used for distinguishing different search spaces rather than the absolute order of the search spaces. For each search space, the configuration or agreement manner of which is the first and which is the second is not limited in the present disclosure, for example, which is the first and which is the second may be agreed based on a certain rule, or may be distinguished based on a time domain position corresponding to the search space or other information. Certainly, in actual application, there may be no actual first or second search space, but one or some identifiers of the search space may be used to distinguish different search spaces.

In some examples, for candidate search spaces that may be used for the PDCCH multiple repetition transmissions, a repetition number set (which may include one or more repetition number) corresponding to each candidate search space may be different. Based on the configuration, when the base station sends the PDCCH to a UE, the search space to be used may be determined based on the number of repeated transmission required. For example, taking the above four candidate search spaces that may be used for repeatedly transmitting the PDCCH are configured in one slot shown in FIG. 3 as an example, the repetition transmissions set corresponding to a first candidate search space may be configured as {1, 2, 3, 4}, the repetition transmissions set corresponding to a second candidate search space may be configured as {2, 3, 4}, the repetition transmissions set corresponding to a third candidate search space may be configured as {3, 4}, and the repetition transmissions set corresponding to a fourth candidate search space may be configured as {4}. Based on the configuration, when the base station sends the PDCCH, if the transmission times of the PDCCH is 1, the used search space is the first candidate search space, and if the transmission times of the PDCCH is 2, the used search space is the first candidate search space and the second candidate search space.

Principle Three:

In some examples, in one slot, different PDCCH repetition number may correspond to different aggregation levels of CCEs and/or different candidate transmission locations of the PDCCH. In other words, the correspondence relationship between the CEE aggregation level corresponding to the candidate search space and/or different candidate transmission locations of the PDCCH and the PDCCH repetition number may be limited to avoid or reduce the problem that the limitation on the number of blind decoding and on the non-overlapping CCEs may be exceeded in one slot.

In some examples, different PDCCH repetition number may correspond to different aggregation levels of CCEs and/or configurations of different candidate transmission locations of the PDCCH that may be for any search space of one slot, and if candidate search spaces that may be used for the PDCCH multiple repetition transmissions are configured, the configuration may be for these candidate search spaces.

As an example, FIGS. 4a and 4b show schematic diagrams of a configuration manner of two search spaces provided by the present disclosure, where the configuration manner may also be referred to as a search space pattern, for example, the configuration manner in FIG. 4a is search space pattern 1, the configuration manner in FIG. 4b is search space pattern 2, and the search space pattern 1 and the search space pattern 2 are, respectively, corresponding to different PDCCH repetition number. For example, when the repetition number is 1, a corresponding search space is pattern 1, and when the repetition number is greater than 1, a corresponding search space is pattern 2. It can be seen from the figure that, for the search space pattern 1, the aggregation levels (AL) supported by the search space include 4, 8, and 16, and the candidate transmission locations of the PDCCH corresponding to each aggregation level is 2, 1, and 1 respectively, while the aggregation level supported by the search space pattern 1 is only 16, and the candidate transmission location corresponding to the aggregation level is 1.

It should be noted that, for each optional configuration manner provided in the above description of the present disclosure, some or all of the configuration manners may be agreed upon by a protocol, that is, the configuration manners are known between the base station and the UE, or may be indicated to the UE by the base station through signaling or other manners. For example, the configuration manners are shown in FIGS. 2, 3, 4*a* and 4*b* may be agreed upon by the protocol. In actual application, when the base station needs to send the PDCCH to the UE, the base station may also be sent other relevant indication information to the UE, such that the UE can perform blind decoding on the PDCCH based on the indication information, and the complexity of blind decoding for the UE is reduced. For example, for the configuration manner shown in FIG. 2, when the search space can support a plurality of ALs, the base station may send configuration information to the UE for indicating the AL. For example, when the ALs supported by the search space are 4, 8, and 16, and the base station can indicate the UE to send the PDCCH, an aggregation level set corresponding to the search space is {4, 8}, then the UE may perform blind decoding on the PDCCH based on the AL set.

The following describes each optional embodiment provided in the present disclosure. Each optional embodiment may be implemented based on one or more of the above a plurality of principles or a part of one principle provided in the present disclosure.

Figure 5:
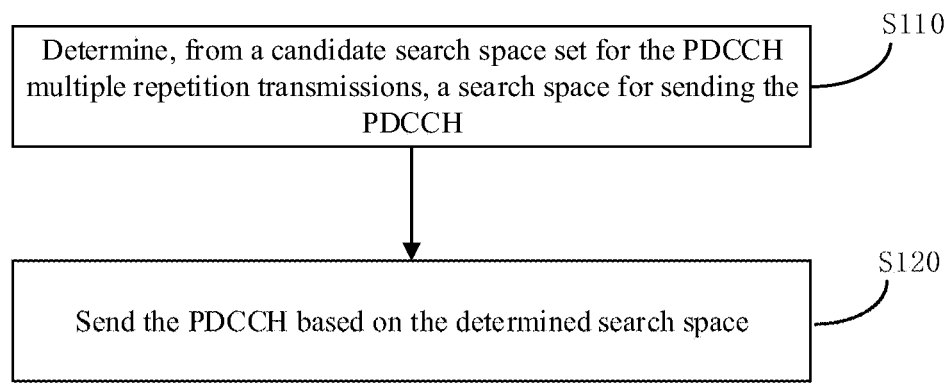
FIG. 5 is a schematic flowchart of a method for sending a physical downlink control channel according to an example of the present disclosure.

FIG. 5 shows a method for sending a physical downlink control channel provided by the present disclosure. The method may be specifically implemented by a base station, and as shown in FIG. 5, the method may include:

S110: determining, from a candidate search space set for the PDCCH multiple repetition transmissions, a search space for sending the PDCCH, where the search space for the PDCCH multiple repetition transmissions includes all search spaces or at least one search space in one time unit.

S120: sending the PDCCH based on the determined search space.

It should be noted that the candidate search space set for the PDCCH multiple repetition transmissions refers to all or part of the search space that can be used for sending the PDCCH a plurality of times in these search spaces, that is, part or all of the search spaces that can be used for sending the PDCCH a plurality of times. Certainly, in actual application, the search space that can be used for sending the PDCCH a plurality of times may also be used for sending the PDCCH once. In other words, in S120, sending the PDCCH based on the determined search space may be that the base station sends the PDCCH once in the determined search space, or the base station sends the PDCCH repeatedly in the determined search space, that is, the same PDCCH is sent for a plurality of times.

In some examples, when the base station determines the search space for sending the PDCCH from the candidate search space set for the PDCCH multiple repetition transmissions, the search space may be determined based on one or more pieces of information including, but not limited to, the relevant information of the UE (such as capability information of the UE), channel conditions, the number of times that the PDCCH needs to be sent, and the like. For example, if transmission times of the PDCCH one, the base station may randomly select a search space for sending the PDCCH from search spaces that can be used for the PDCCH multiple repetition transmissions, and may also select based on the channel condition, for example, if the channel conditions are poor, a search space supporting a larger aggregation level is selected.

In some examples, in the present disclosure, for each candidate search space used (that can be used) for the PDCCH multiple repetition transmissions, the aggregation level set corresponding to the candidate search space may be a subset of a full aggregation level set, and/or, the number of the candidate transmission locations of the PDCCH corresponding to each aggregation level in the aggregation level set is less than or equal to a set number corresponding to the aggregation level.

The above described full aggregation level set refers to an aggregation level set in an existing NR system, that is, an aggregation level set including 1, 2, 4, 8, and 16. For one aggregation level, the set number refers to the number of the candidate transmission locations of the PDCCH corresponding to one aggregation level in the existing NR system.

In this optional solution, it is possible to control the PDCCH blind decoding complexity of the UE by limiting the aggregation level supported by the search space and/or the candidate transmission locations of the PDCCH that may be used for the PDCCH multiple repetition transmissions. As an optional solution, in the example shown in FIG. 2, for one time unit, a plurality of search spaces for the PDCCH multiple repetition transmissions within the time unit may be configured, that is, some search spaces are used as search spaces that may be used for the PDCCH multiple repetition transmissions, and the aggregation level of these search spaces and/or the candidate transmission locations of the PDCCH may be limited. Accordingly, when receiving the PDCCH sent by the base station, the UE may perform blind decoding on the PDCCH on these search spaces based on the aggregation level corresponding to each search space and/or the configuration information of the candidate transmission locations of the PDCCH.

The time granularity of a time unit is not limited in the present disclosure. In some examples, one time unit may be a slot, and in the foregoing description of the principles of the present disclosure, the time granularity of one time unit is described by taking the slot as an example. In actual application, the time unit may also use other time granularity corresponding to different actual application requirements or application scenarios.

In an optional embodiment of the present disclosure, a search space for sending the PDCCH is determined from a search space for the PDCCH multiple repetition transmissions, including:

determining, based on the repetition number of the PDCCH, the search space for sending the PDCCH.

As an optional solution, a correspondence relationship between a search space that can be used for PDCCH multiple repetition transmissions and the repetition number of the PDCCH may be limited, and when a base station sends the PDCCH, which search space(s) are used may be determined based on the repetition number of the PDCCH. As another optional solution, a search space used may also be determined based on the repetition number the PDCCH and configuration parameters of each search space. For example, different search spaces correspond to different ALs, when the search space is determined, a corresponding number of search spaces may be selected based on the repetition number and a channel condition, for example, when the channel conditions are relatively poor, a search space with a relatively large support level is selected.

In an optional embodiment of the present disclosure, determining the search space for sending the PDCCH based on the repetition number of the PDCCH includes:

determining, based on the repetition number of the PDCCH and the first mapping relationship, the search space for sending the PDCCH, where the first mapping relationship at least includes a search space corresponding to each candidate repetition number.

In some examples, sets of search space corresponding to the candidate repetition number of each PDCCH are not exactly the same or completely different;

or sets of the candidate repetition number of the PDCCH corresponding to each candidate search space are not exactly the same or completely different.

In the present disclosure, for one PDCCH, the candidate repetition number refers to the number of times that the base station may send the PDCCH, and it is assumed that the maximum number times of repeated sending of one PDCCH is 4, the candidate repetition number may be 1, 2, 3, or 4.

In an example, a corresponding search space set may be configured for each candidate repetition number, or the repetition number of the PDCCH supported by the search space may be configured for each search space that can be used for sending the PDCCH a plurality of times. In other words, the above mapping relationship may be configured for the repetition number, and a search space set corresponding to each repetition number is different; or may be configured for search spaces, and each search space corresponds to a different repetition number set.

Taking FIG. 3 as an example, four candidate search spaces used for sending the PDCCH a plurality of times are configured in one slot. In an optional manner, for the repetition number being 1 (namely, R=1 as shown in the figure), the repetition number is 2, etc., a search space set corresponding to the number of times may be configured. For example, when R=1, the search space includes the first candidate search space as shown in FIG. 3, and when R=2, the search space includes the first candidate search space and the second candidate search space shown in FIG. 3. In another optional manner, each search space may be configured, for example, for the first candidate search space, the corresponding set of repetition number may include 1, 2, 3, and 4, and for the second candidate search space, the corresponding set of repetition number may include 2, 3, and 4.

In an optional embodiment of the present disclosure, the method further includes:

sending indication information, where the indication information is configured to indicate at least one candidate repetition number of the PDCCH.

In actual application, for one PDCCH, when a base station sends the PDCCH to a UE, the base station can determine that the PDCCH is sent several times, and thus, the base station may send instruction information to the UE to inform the UE of at least one candidate repetition number, that is, possible repetition number. For example, when the base station needs to repeatedly send the PDCCH twice, the base station may inform the UE that the candidate repetition number is 1 or 2, and when performing blind decoding on the PDCCH, the UE may perform blind decoding on the PDCCH based on the indicated repetition number and other configurations. The base station informs the UE that the possible repetition number may be one number of times, or may be a set of number of times, that is, the above possible number of times of sending may be the actual number of times of sending by the base station, or may include the actual number of times of sending and other possible number of times of sending.

In an optional embodiment of the present disclosure, the candidate search space set for the PDCCH multiple repetition transmissions includes a plurality of (including two or more) search spaces, and the plurality of search spaces correspond to the same searchSpaceId, or some or all of the search spaces in the plurality of search spaces correspond to different searchSpaceIds.

In other words, for a plurality of candidate search spaces for the PDCCH multiple repetition transmissions, the plurality of search spaces may correspond to the same search space set, or at least two of the plurality of search spaces may correspond to different search space sets, respectively. For example, for three search spaces that can be used for the PDCCH multiple repetition transmissions as shown in FIG. 2, the spaces S1, S2, and S3 may be three search spaces under the same searchSpaceId, or two of three search spaces are search spaces under the same searchSpaceId, and the other one is a search space under another searchSpaceId, or the spaces S1, S2, and S3 correspond to three different seachSpaceIDs respectively.

In an optional embodiment of the present disclosure, the candidate search space set for the PDCCH multiple repetition transmissions includes a plurality of (two or more) search spaces, and at least two search spaces of the plurality of candidate search spaces correspond to different first configuration parameters, where the first configuration parameter includes at least one of the following parameters:

an aggregation level set, or candidate transmission locations of the PDCCH corresponding to each aggregation level in the aggregation level set.

That is, part or all of the plurality of candidate search spaces for the PDCCH multiple repetition transmissions may be configured to correspond to different aggregation level sets and/or the candidate transmission locations of the PDCCH. Based on the solution, when the base station sends the PDCCH, the PDCCH can be sent one or more times based on the determined aggregation level set of the search spaces and/or the candidate transmission locations of the PDCCH. Accordingly, when the UE performs the blind decoding on the PDCCH in at least one of the candidate search spaces, the UE may perform blind decoding based on the configuration parameters respectively corresponding to each candidate search space.

As an optional solution, for different candidate search spaces that may be used for the PDCCH multiple repetition transmissions, a correspondence relationship between different aggregation level sets and candidate transmission locations may be configured. In an example as shown in FIG. 2, the candidate search space S1 corresponds to a mapping relationship between an AL and candidate transmission locations of the PDCCH, and the search spaces S2, and S3 correspond to another mapping relationship between an AL and candidate transmission locations of the PDCCH.

In an optional solution of the present disclosure, the method further includes:

sending first configuration information, where the first configuration information is configured to indicate to a receiver a searchSpaceId corresponding to a search space for sending the PDCCH.

In other words, by sending the configuration information (or may be referred to as indication information or other names), the base station may inform the UE of which search space(s) (the candidate search space(s) that can be used for the PDCCH multiple repetition transmissions) corresponding to the searchSpace(s) to repeatedly send of the same PDCCH a plurality of times. The solution is applicable to the case where a plurality of candidate search spaces correspond to the same searchSpaceId, and it is also applicable to the case where a plurality of candidate search spaces correspond to at least two searchSpaceIds.

Certainly, it may also agreed that the candidate search space corresponding to which search space ID(s) may be used to transmit a plurality of times of repeated transmission of the same PDCCH, or the base station and the UE may determine by themselves based on a pre-agreed rule, or the candidate search spaces under all the configured searchSpaceIds in one time unit may be used to transmit by default. At this time, the base station may not send the configuration information to the UE. For example, for one UE, it may be agreed to perform PDCCH transmission in a search space under a searchSpaceId satisfying a preset condition (e.g., a smaller ID number) in all the searchSpace-Ids corresponding to the UE.

In an embodiment of the present disclosure, the method further includes:
  determining, based on the repetition number of the PDCCH and the second mapping relationship, the second configuration parameter corresponding to the search space for sending the PDCCH,
  where the second mapping relationship is a correspondence relationship between each the repetition number and the second configuration parameter, and the second configuration parameter includes at least one of the following parameters:
  an aggregation level set, or candidate transmission locations of the PDCCH corresponding to each aggregation level in the aggregation level set; and
  accordingly, at this time, sending the PDCCH based on the determined search space may include:
  sending the PDCCH in the determined search space based on the determined second configuration parameter.

In an optional manner, correspondence relationship between retransmission times of the PDCCH and at least one of an aggregation level or a PDCCH candidate transmission location corresponding to the aggregation level is limited. When a base station sends one PDCCH, a configuration parameter corresponding to a search space may be determined based on the number of times required to be sent, and the PDCCH is sent repeatedly one or more times in the determined search space based on the configuration parameter. For example, as shown in FIGS. 4a and 4b, the correspondence relationships between two AL sets and PDCCH candidate transmission locations are as follows: when the repetition number is 1, the configuration parameter corresponding to the candidate search space for sending the PDCCH is the configuration parameter shown in correspondence relationship 1; and when the sending time is greater than 1, the configuration parameter corresponding to the candidate search space for sending the PDCCH is the configuration parameter shown in correspondence relationship 2.

The following describes a method for receiving a physical downlink control channel provided in the present disclosure from the UE side, and the receiving method may include:
  determining a candidate search space set for the PDCCH multiple repetition transmissions; and
  blind decoding the PDCCH based on the determined candidate search space for the PDCCH multiple repetition transmissions;
  where the search space for the PDCCH multiple repetition transmissions includes all search spaces or at least one search space in one time unit.

For the UE receiving the PDCCH, since the UE generally does not know the PDCCH is sent by base station in which candidate search space(s), the UE generally needs to perform blind decoding on the PDCCH in all possible candidate search spaces. Similarly, in the present disclosure, for one PDCCH, if the base station repeatedly sends the PDCCH one or more times, the UE needs to perform blind decoding on the PDCCH on the candidate search space set for the PDCCH multiple repetition transmissions.

In an optional embodiment of the present disclosure, determining the candidate search space set for the PDCCH multiple repetition transmissions includes:
  determining the candidate repetition number of at least one PDCCH; and
  determining, based on the candidate repetition number of the PDCCH, the candidate search space set for sending the PDCCH.

It can be seen from the foregoing description that for different candidate repetition number of the PDCCH, different candidate search space sets may be correspondingly provided; alternatively, different candidate search spaces may correspond to different repetition number of the PDCCH, and then when performing the PDCCH blind decoding, the UE may determine candidate search spaces corresponding to each candidate repetition number respectively based on the determined candidate repetition number of the one or more PDCCHs, so as to perform the PDCCH blind decoding in at least one determined candidate search space.

For example, taking FIG. 3 as an example, for candidate repetition number 1, the corresponding search space set is the first candidate search space, and for candidate repetition number 1, the UE only needs to perform blind decoding in the first candidate search space; and for candidate repetition number 2, the UE needs to perform blind decoding in the first and second candidate search spaces.

In an optional embodiment of the present disclosure, based on the candidate repetition number of the PDCCH, determining the candidate search space set for sending the PDCCH includes:
  determining, based on the candidate repetition number of the PDCCH and the first mapping relationship, the candidate search space for sending the PDCCH,
  where the first mapping relationship at least includes a search space corresponding to each candidate repetition number. For the first mapping relationship, reference may be made to the foregoing detailed description of the first mapping relationship, and details are not described here again.

In some examples, sets of search space corresponding to the candidate repetition number of each PDCCH are not exactly the same or completely different;
  or
  sets of the candidate repetition number of the PDCCH corresponding to each candidate search space are not exactly the same or completely different.

In an embodiment of the present disclosure, the method further includes:

receiving indication information of PDCCH repetition number sent by a base station, where the indication information is configured to indicate at least one candidate repetition number of the PDCCH.

That is, for one PDCCH, the base station may inform the UE of the possible repetition number (namely, the candidate repetition number) through the indication information. The specific form of the information is not limited in the present disclosure. In some examples, the indication information may be display information, that is, information directly indicating the candidate repetition number, or may be implicit information. After receiving the implicit information, the UE may determine the repetition number of the PDCCH based on system agreement or other configuration information.

Certainly, in actual application, the base station may also not send the indication information to the UE, and the UE needs to perform blind decoding in the search space corresponding to all possible times. For example, a protocol may agree that the maximum repetition number is 4, and the base station may inform the UE through the indication information that the repetition transmissions of the PDCCH may be 1 and 2, or when the base station does not inform the UE, the UE performs PDCCH blind decoding on all possible search spaces corresponding to 1, 2, 3 and 4 times.

In an optional embodiment of the present disclosure, blind decoding the PDCCH based on the determined candidate search space set for the PDCCH multiple repetition transmissions includes:

blind decoding, based on a first configuration parameter corresponding to at least one candidate search space in the determined candidate search space set for the PDCCH multiple repetition transmissions, the PDCCH in the at least one PDCCH candidate search space, where the first configuration parameter includes at least one of the following parameters:

an aggregation level set, or candidate transmission locations of the PDCCH corresponding to each aggregation level in the aggregation level set.

It can be seen from the foregoing description that, for candidate search spaces for the PDCCH multiple repetition transmissions, each candidate search space may correspond to different aggregation level sets, and/or, each candidate search space corresponds to the number of different candidate transmission locations of the PDCCH, and at this time, when performing blind decoding on the PDCCH, the UE may perform blind decoding based on configuration parameters corresponding to each candidate search space. For example, in the three candidate search spaces shown in FIG. 2, the space S1 corresponds to an aggregation level set and a mapping relation between PDCCH candidate transmission locations corresponding to each aggregation level in the set, and the space S2 and the space S3 corresponds to another mapping relationship. When the UE performs blind decoding on the PDCCH in the space S1, the UE needs to perform blind decoding based on the mapping relationship corresponding to the space, and when performing blind decoding in the space S2 and the space S3, a mapping relationship corresponding to the two spaces needs to be blindly decoded.

It should be noted that, in actual application, for one PDCCH, for a determined candidate search space set for the PDCCH multiple repetition transmissions, when there are a plurality of candidate search spaces, if the UE blindly decodes the PDCCH in one or more search spaces of the plurality of candidate search spaces, the UE may not perform blind decoding in other candidate search spaces any longer, and certainly, or may perform blind decoding on the PDCCH regardless of whether the PDCCH is decoded in one or more search spaces, the UE continues to perform blind decoding. In other words, the UE may perform PDCCH blind decoding in each search space, or may stop the PDCCH blind decoding after the PDCCH is retrieved in a certain candidate search space.

In an optional embodiment of the present disclosure, determining a candidate search space set for the PDCCH multiple repetition transmissions, and blind decoding the PDCCH based on the determined candidate search space set for the PDCCH multiple repetition transmissions may include:

determining first configuration information, where the first configuration information is configured to indicate a searchSpaceId corresponding to a search space for sending the PDCCH; and blind decoding the PDCCH in a candidate search space set for the PDCCH multiple repetition transmissions corresponding to the searchSpaceId indicated by the first configuration information.

In some examples, the configuration information may be pre-agreed configuration information, or may be sent by the base station to the UE, that is, the base station may inform the UE through the configuration information which searchSpaceId(s) corresponding to which search space(s) may be used for the PDCCH multiple repetition transmissions for PDCCH blind decoding. A specific manner in which the base station sends the first configuration information to the UE is not limited in the embodiment of the present disclosure.

In an optional embodiment of the present disclosure, blind decoding the PDCCH based on the determined candidate search space set for the PDCCH multiple repetition transmissions of time may include:

determining, based on the candidate repetition number of at least one of PDCCH and the second mapping relationship, a second configuration parameter corresponding to the candidate repetition number of the at least one PDCCH, where the second mapping relationship is a correspondence relationship between each repetition number and each second configuration parameter; and blind decoding, based on the second configuration parameter corresponding to the at least one candidate repetition number, the PDCCH in a search space corresponding to the at least one candidate repetition number, where the second configuration parameter includes at least one of the following parameters:

an aggregation level set, or candidate transmission locations of the PDCCH corresponding to each aggregation level in the aggregation level set.

Similarly, in actual application, when a UE performs blind decoding on a PDCCH, if a PDCCH is blindly decoded in a search space corresponding to the candidate repetition number of a certain PDCCH, the UE may not continue to perform blind decoding in other search spaces, or may continue to perform blind decoding in other determined search spaces regardless of whether a PDCCH is blindly decoded in a search space corresponding to the candidate repetition number of a certain PDCCH.

For the second mapping relationship, reference may be made to the foregoing detailed description of the second mapping relationship, and details are not described herein again.

It is clear to those skilled in the art that optional embodiments may be used in combination or modified by those skilled in the art based on the technical principles provided in the present disclosure and the above optional embodiments. In addition, the methods described respectively at the base station side and the UE side can be referred to each other, and the description of technical terms related to the base station side is also applicable to the UE side, and the detailed description of each optional solution at the base station side may also be applicable to each optional solution at the UE side corresponding to the base station side.

Figure 6:
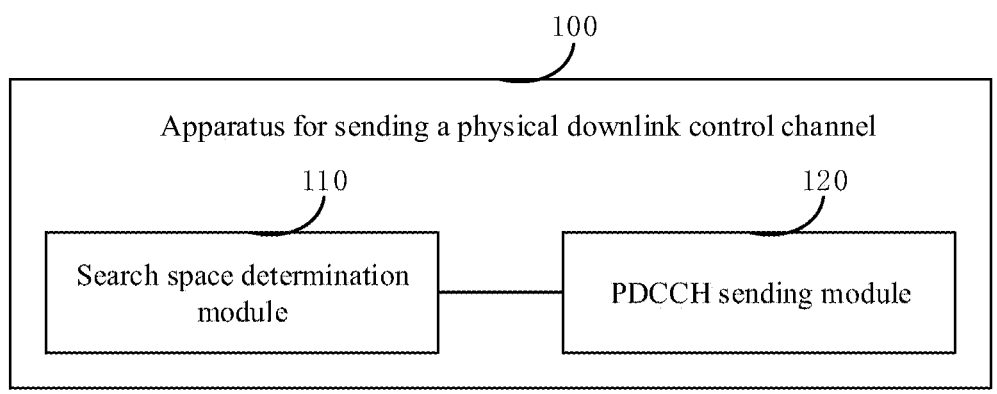
FIG. 6 is a schematic structural diagram of an apparatus for sending a physical downlink control channel according to an example of the present disclosure.

Based on the same principle as a sending method for a physical downlink control channel provided in the embodiments of the present disclosure, the present disclosure further provides a sending apparatus for a physical downlink control channel. The apparatus may be specifically implemented as a base station or a physical device in the base station, as shown in FIG. 6, the sending apparatus 100 for the physical downlink control channel may include a search space determination module 110 and a the PDCCH sending module 120. where the search space determination module 110 is configured to determine, from a candidate search space set for the PDCCH multiple repetition transmissions, a search space for sending the PDCCH, where the candidate search space set for the PDCCH multiple repetition transmissions includes all search spaces or at least one search space in one time unit; and the PDCCH sending module 120 is configured to send the PDCCH based on the determined search space.

In some examples, the search space determination module is further configured to:

determining, based on the repetition number of the PDCCH, the search space for sending the PDCCH.

In some examples, when determining a search space used for transmitting the PDCCH based on the repetition number of the PDCCH, the search space determination module may be configured to:

determining, based on the repetition number of the PDCCH and the first mapping relationship, the search space for sending the PDCCH, where the first mapping relationship at least includes a search space corresponding to each candidate repetition number.

In some examples, sets of search space corresponding to the candidate repetition number of each PDCCH are not exactly the same or completely different;

or sets of the candidate repetition number of the PDCCH corresponding to each candidate search space are not exactly the same or completely different.

In some examples, the sending apparatus further includes a first information sending module, and the first information sending module is configured to:

send indication information, where the indication information is configured to indicate at least one candidate repetition number of the PDCCH.

In some examples, the candidate search space set for the PDCCH multiple repetition transmissions includes two or more search spaces, and the two or more search spaces correspond to the same searchSpaceId, or some or all of the two or more search spaces correspond to different searchSpaceIds.

In some examples, the candidate search space set for the PDCCH multiple repetition transmissions includes two or more search spaces, at least two search spaces of the two or more search spaces correspond to different first configuration parameters, and the first configuration parameter includes at least one of the following parameters:

an aggregation level set, or candidate transmission locations of the PDCCH corresponding to each aggregation level in the aggregation level set.

In some examples, the sending apparatus further includes a second information sending module, and the second information sending module configured to:

sending first configuration information, where the first configuration information is configured to indicate to a receiver a searchSpaceId corresponding to a search space for sending the PDCCH.

In some examples, the PDCCH sending module is further configured to:

determining, based on the repetition number of the PDCCH and the second mapping relationship, the second configuration parameter corresponding to the search space for sending the PDCCH, where the second mapping relationship is a correspondence relationship between each the repetition number and the second configuration parameter, and the second configuration parameter includes at least one of the following parameters:

an aggregation level set, or candidate transmission locations of the PDCCH corresponding to each aggregation level in the aggregation level set;

where when sending the PDCCH based on the determined search space, the PDCCH sending module may be configured to:

send the PDCCH based on the determined second configuration parameter and the determined search space.

Based on the same principle as a receiving method for a physical downlink control channel provided in the embodiments of the present disclosure, the present disclosure further provides a receiving apparatus for a physical downlink control channel. The apparatus may be specifically implemented as a user equipment or a physical component in the user equipment, where the apparatus includes a PDCCH blind decoding module, and the PDCCH blind decoding module is configured to:

determine a candidate search space set for the PDCCH multiple repetition transmissions, and blindly decode the PDCCH based on a determined candidate search space set for the PDCCH multiple repetition transmissions, where the candidate search space set for the PDCCH multiple repetition transmissions includes all search spaces or at least one search space in one time unit.

In some examples, when determining a candidate search space set for the PDCCH multiple repetition transmissions, the PDCCH blind decoding module may be configured to:

determining the candidate repetition number of at least one PDCCH; and determining, based on the candidate repetition number of the PDCCH, the candidate search space set for sending the PDCCH.

In some examples, when determining a candidate search space used for transmitting the PDCCH based on the candidate repetition number of the PDCCH, the PDCCH blind decoding module may be configured to:

determining, based on the candidate repetition number of the PDCCH and the first mapping relationship, the candidate search space for sending the PDCCH, where the first mapping relationship at least includes a search space corresponding to each candidate repetition number.

In some examples, sets of search space corresponding to the candidate repetition number of each PDCCH are not exactly the same or completely different;
or
sets of the candidate repetition number of the PDCCH corresponding to each candidate search space are not exactly the same or completely different.

In some examples, the receiving apparatus further includes an information receiving module, and the information receiving module is configured to:
receiving indication information of PDCCH repetition number sent by a base station, where the indication information is configured to indicate at least one candidate repetition number of the PDCCH.

In some examples, when blind decoding the PDCCH based on the determined candidate search space set for the PDCCH multiple repetition transmissions, the PDCCH blind decoding module may be configured to:
blindly decode, based on a first configuration parameter corresponding to at least one candidate search space in the determined candidate search space set for the PDCCH multiple repetition transmissions, the PDCCH in the at least one candidate search space,
where the first configuration parameter includes at least one of the following parameters:
an aggregation level set, or
candidate transmission locations of the PDCCH corresponding to at least one aggregation level in the aggregation level set.

In some examples, the PDCCH blind decoding module may be configured to:
determining first configuration information, where the first configuration information is configured to indicate a searchSpaceId corresponding to a search space for sending the PDCCH; and
blind decoding the PDCCH in a candidate search space set for the PDCCH multiple repetition transmissions corresponding to the searchSpaceId indicated by the first configuration information.

In some examples, when blind decoding the PDCCH based on the determined candidate search space set for the PDCCH multiple repetition transmissions, the PDCCH blind decoding module may be configured to:
determine, based on the candidate repetition number of at least one of PDCCH and the second mapping relationship, a second configuration parameter corresponding to the candidate repetition number of the at least one PDCCH, where the second mapping relationship is a correspondence relationship between each repetition number and each second configuration parameter; and
blindly decode, based on the second configuration parameter corresponding to the at least one candidate repetition number, the PDCCH in a search space corresponding to the at least one candidate repetition number,
where the second configuration parameter includes at least one of the following parameters:
an aggregation level set, or
candidate transmission locations of the PDCCH corresponding to each aggregation level in the aggregation level set.

It should be noted that, since the apparatus provided in the embodiment of the present disclosure is an apparatus capable of executing the corresponding method provided in the embodiment of the present disclosure, based on the method provided in the embodiments of the present disclosure, those skilled in the art can understand the specific embodiments of the apparatus according to the embodiments of the present disclosure and various modifications thereof, hence, how to implement the method in the embodiment of the present disclosure by the apparatus will not be described in detail here. Any apparatus used by those skilled in the art to implement the methods in the embodiments of the present disclosure shall fall within the protection scope of the present disclosure. Each module included in the foregoing apparatus may be specifically implemented through software and/or hardware.

The present disclosure further provides an electronic device, which may include at least one processor, and the processor may be configured to execute the method provided in any one of the optional embodiments of the present disclosure.

In some examples, the electronic device may include at least one memory in which a computer program (or may be referred to as a computer instruction or code) is stored, and when executing the computer program, at least one processor may execute the method for sending a PDCCH according to any one of the optional embodiments of the present disclosure, or the method for receiving a PDCCH according to any one of the optional embodiments.

The present disclosure further provides a computer-readable storage medium on which a computer program is stored. When being run by a processor, the computer program can execute the method for sending a PDCCH according to any one of the optional embodiments of the present disclosure, or the method for receiving a PDCCH according to any one of the optional embodiments.

Figure 7:
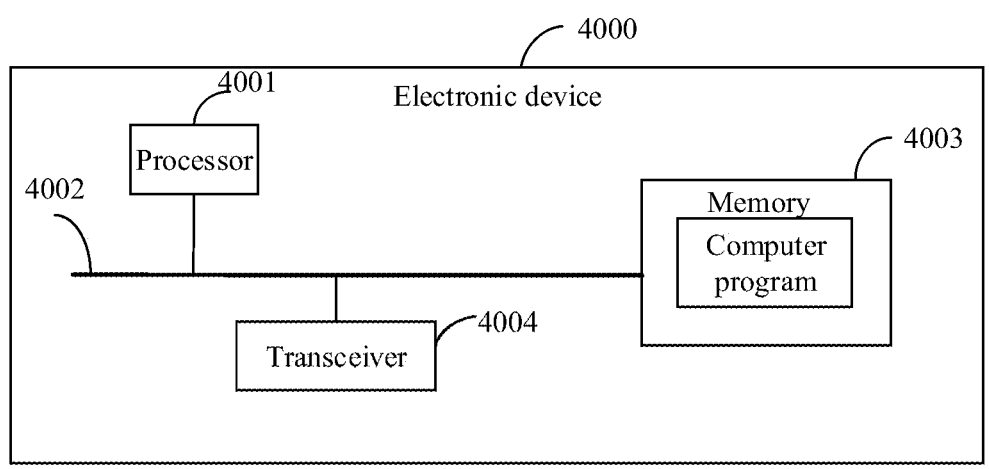
FIG. 7 is a schematic structural diagram of an electronic device according to an example of the present disclosure.

As an example, FIG. 7 shows a schematic structural diagram of an electronic device that is applicable to a solution provided in the present disclosure, and the method provided in any optional embodiment of the present disclosure may be implemented by the electronic device. As shown in FIG. 7, the electronic device 4000 includes: a processor 4001, and a memory 4003. The processor 4001 and the memory 4003 are connected, such as through a bus 4002. In some examples, the electronic device 4000 may further include a transceiver 4004. It should be noted that in actual application, the transceiver 4004 is not limited to one, and the structure of the electronic device 4000 does not limit the embodiments of the present disclosure.

The processor 4001 may be a central process unit (CPU), a digital signal processor (DSP), an application specific integrated circuit (ASIC), a field programmable gate array (FPGA), or another programmable logic device, a transistor logic device, a hardware component, or any combination thereof. The processor 4001 may implement or execute the various exemplary logical blocks, modules, and circuits described in conjunction with the present disclosure. The processor 4001 may also be a combination for realizing calculation functions, for example, the processor 401 may include one or more microprocessor combinations, a combination of a DSP and a microprocessor, etc.

A bus 4002 may include a pathway for transmitting information between the above components. The bus 4002 may be a peripheral component interconnect (PCI) bus or an extended industry standard architecture (EISA) bus, etc. The bus 4002 may be divided into an address bus, a data bus, a control bus, etc. For ease of representation, only one thick line is shown in FIG. 7, but it does not indicate that there is only one bus or one type of bus.

The memory 4003 may be a read only memory (ROM) or other type of static storage device that may store static information and instructions, a random access memory (RAM) or other type of dynamic storage device that may store information and instructions, or may be an electrically erasable programmable read only memory (EEPROM), a compact disc read only memory (CD-ROM) or other optical disk storage, optical disk storage (including compact disk, laser disk, optical disk, digital versatile disk, Blu-ray disk, etc.), magnetic disk storage media or other magnetic storage devices, or any other medium that can be used to carry or store desired program code in the form of instructions or data structures and that can be accessed by a computer, but is not limited thereto.

The memory 4003 is configured to store application program codes (computer programs) for executing the solutions of the present disclosure, and the execution is controlled by the processor 4001. The processor 4001 is configured to execute application program codes stored in the memory 4003 to implement the contents shown in any of the foregoing method embodiments.

It should be understood that although the steps in the flowcharts of the drawings are sequentially displayed as indicated by arrows, the steps are not sequentially executed necessarily as indicated by the arrows. Unless explicitly stated in this document, the execution of the steps is not strictly limited in order, and the steps may be executed in other order. Moreover, at least a part of the steps in the flowcharts of the drawings may include a plurality of sub-steps or stages, the sub-steps or stages are not completed at the same time necessarily, but may be executed at different times, and the execution order is not necessarily sequential, but the sub-steps or stages may be executed in turn or alternately with other steps or at least a part of the sub-steps or stages of the other steps.

The above are merely part of the embodiments of the present disclosure, and it should be noted that, for those of ordinary skill in the art, several improvements and modifications may be made without departing from the principle of the present disclosure, and the improvements and modifications are also regarded to be within the protection scope of the present disclosure.

What is claimed is:

1. A method for sending a physical downlink control channel, comprising:
   determining, from a candidate search space set for the physical downlink control channel (PDCCH) multiple repetition transmissions, a search space for sending the PDCCH, wherein the candidate search space set for the PDCCH multiple repetition transmissions comprises all search spaces or at least one search space in one time unit; and
   sending the PDCCH based on the determined search space;
   wherein the candidate search space set for the PDCCH multiple repetition transmissions comprises two or more search spaces; at least two search spaces of the two or more search spaces correspond to different first configuration parameters; and
   the two or more search spaces correspond to the same searchSpaceId, or some or all of the two or more search spaces correspond to different searchSpaceIds respectively; and
   the first configuration parameter at least comprises candidate transmission locations of the PDCCH corresponding to each aggregation level in the aggregation level set.

2. The method according to claim 1, wherein determining, from the candidate search space set for the PDCCH multiple repetition transmissions, the search space for sending the PDCCH comprises:
   determining, based on a repetition number of the PDCCH, the search space for sending the PDCCH.

3. The method according to claim 2, wherein determining, based on the repetition number of the PDCCH, the search space for sending the PDCCH comprises:
   determining, based on the repetition number of the PDCCH and a first mapping relationship, the search space for sending the PDCCH,
   wherein the first mapping relationship at least comprises a search space corresponding to each candidate repetition number.

4. The method according to claim 2, wherein
   sets of search space corresponding to a candidate repetition number of each PDCCH are not exactly the same or completely different.

5. The method according to claim 1, the method further comprises:
   sending indication information, wherein the indication information is configured to indicate at least one candidate repetition number of the PDCCH.

6. The method according to claim 1, wherein the first configuration parameter further comprises
   an aggregation level set.

7. The method according to claim 6, wherein the method further comprises:
   sending first configuration information, wherein the first configuration information is configured to indicate to a receiver a searchSpaceId corresponding to a search space for sending the PDCCH.

8. The method according to claim 1, wherein the method further comprises:
   determining, based on a repetition number of the PDCCH and a second mapping relationship, a second configuration parameter corresponding to the search space for sending the PDCCH,
   wherein the second mapping relationship is a correspondence relationship between each the repetition number and the second configuration parameter, and the second configuration parameter comprises at least one of:
   an aggregation level set, or
   candidate transmission locations of the PDCCH corresponding to each aggregation level in the aggregation level set;
   wherein sending the PDCCH based on the determined search space comprises:
   sending the PDCCH in the determined search space based on the determined second configuration parameter.

9. The method according to claim 2, wherein
   sets of a candidate repetition number of the PDCCH corresponding to each candidate search space are not exactly the same or completely different.

10. A method for receiving a physical downlink control channel, comprising:
    determining a candidate search space set for the PDCCH multiple repetition transmissions; and
    blind decoding the PDCCH based on a determined candidate search space set for the PDCCH multiple repetition transmissions, wherein the candidate search space set for the PDCCH multiple repetition transmissions comprises all search spaces or at least one search space in one time unit;

wherein blind decoding the PDCCH based on the determined candidate search space set for the PDCCH multiple repetition transmissions comprises:
blind decoding, based on a first configuration parameter corresponding to at least one candidate search space in the determined candidate search space set for the PDCCH multiple repetition transmissions, the PDCCH in the at least one candidate search space;
wherein the candidate search space set for the PDCCH multiple repetition transmissions comprises two or more search spaces; at least two search spaces of the two or more search spaces correspond to different first configuration parameters; and the two or more search spaces correspond to the same searchSpaceId, or some or all of the two or more search spaces correspond to different searchSpaceIds respectively; and
the first configuration parameter at least comprises candidate transmission locations of the PDCCH corresponding to each aggregation level in the aggregation level set.

11. The method according to claim 10, wherein determining the candidate search space set for the PDCCH multiple repetition transmissions comprises:
determining a candidate repetition number of at least one PDCCH; and
determining, based on the candidate repetition number of the PDCCH, the candidate search space set for sending the PDCCH.

12. The method according to claim 11, wherein the determining, based on the candidate repetition number of the PDCCH, the candidate search space set for sending the PDCCH comprises:
determining, based on the candidate repetition number of the PDCCH and a first mapping relationship, the candidate search space set for sending the PDCCH, wherein the first mapping relationship at least comprises a search space corresponding to each candidate repetition number.

13. The method according to claim 11, wherein
sets of search space corresponding to the candidate repetition number of each PDCCH are not exactly the same or completely different.

14. The method according to claim 10, wherein the method comprises:
receiving indication information of PDCCH repetition number sent by a base station, wherein the indication information is configured to indicate at least one candidate repetition number of the PDCCH.

15. The method according to claim 10,
wherein the first configuration parameter further comprises
an aggregation level set.

16. The method according to claim 10, wherein determining the candidate search space set for the PDCCH multiple repetition transmissions; and blind decoding the PDCCH based on the determined candidate search space set for the PDCCH multiple repetition transmissions comprises:
determining first configuration information, wherein the first configuration information is configured to indicate a searchSpaceId corresponding to a search space for sending the PDCCH; and blind decoding the PDCCH in the candidate search space set for the PDCCH multiple repetition transmissions corresponding to the searchSpaceId indicated by the first configuration information.

17. The method according to claim 10, wherein the blind decoding the PDCCH based on the determined candidate search space set for the PDCCH multiple repetition transmissions comprises:
determining, based on a candidate repetition number of at least one of PDCCH and the second mapping relationship, a second configuration parameter corresponding to the candidate repetition number of the at least one PDCCH, wherein the second mapping relationship is a correspondence relationship between each repetition number and each second configuration parameter; and
blind decoding, based on the second configuration parameter corresponding to the at least one candidate repetition number, the PDCCH in a search space corresponding to the at least one candidate repetition number,
wherein the second configuration parameter comprises at least one of:
an aggregation level set, or
candidate transmission locations of the PDCCH corresponding to each aggregation level in the aggregation level set.

18. An electronic device, wherein the electronic device comprises a memory and a processor;
a memory, on which a computer program is stored;
the processor is configured to implement the method according to claim 10 when executing the computer program.

19. The method according to claim 11, wherein
sets of the candidate repetition number of the PDCCH corresponding to each candidate search space are not exactly the same or completely different.

20. An electronic device comprising:
a memory, on which a computer program is stored;
a processor that executes the computer program, wherein the computer program causes the processor to:
determine, from a candidate search space set for the physical downlink control channel (PDCCH) multiple repetition transmissions, a search space for sending the PDCCH, wherein the candidate search space set for the PDCCH multiple repetition transmissions comprises all search spaces or at least one search space in one time unit; and
send the PDCCH based on the determined search space;
wherein the candidate search space set for the PDCCH multiple repetition transmissions comprises two or more search spaces; at least two search spaces of the two or more search spaces correspond to different first configuration parameters; and the two or more search spaces correspond to the same searchSpaceId, or some or all of the two or more search spaces correspond to different searchSpaceIds respectively; and
the first configuration parameter at least comprises candidate transmission locations of the PDCCH corresponding to each aggregation level in the aggregation level set.

* * * * *

UNITED STATES PATENT AND TRADEMARK OFFICE
CERTIFICATE OF CORRECTION

PATENT NO. : 12,471,105 B2  
APPLICATION NO. : 17/927512  
DATED : November 11, 2025  
INVENTOR(S) : Qin Mu Page 1 of 1

It is certified that error appears in the above-identified patent and that said Letters Patent is hereby corrected as shown below:

In the Specification  
In Column 4, Lines 44-45, delete "CCE #0˜CCE #3, and CCE #4˜CCE #7." and insert -- CCE#0˜CCE#3, and CCE#4˜CCE#7. --, therefor.  
In Column 4, Line 49, delete "u" and insert -- µ --, therefor.

In the Claims  
In Column 21, Lines 60-63, in Claim 1, delete "the two or more……………respectively; and" and insert the same at Line 59 after "parameters; and" as a continuation sub-point.

Signed and Sealed this  
Twenty-seventh Day of January, 2026

John A. Squires  
*Director of the United States Patent and Trademark Office*